(12) United States Patent
Alemán Vázquez et al.

(10) Patent No.: US 10,793,784 B2
(45) Date of Patent: Oct. 6, 2020

(54) PROCEDURE FOR PREPARATION OF IMPROVED SOLID HYDROGEN TRANSFER AGENTS FOR PROCESSING HEAVY AND EXTRA-HEAVY CRUDE OILS AND RESIDUES, AND RESULTING PRODUCT

(71) Applicant: INSTITUTO MEXICANO DEL PETRÓLEO, Mexico City (MX)

(72) Inventors: Laura Olivia Alemán Vázquez, Mexico City (MX); León Pablo Torres Mancera, Mexico City (MX); Jorge Ancheyta Juárez, Mexico City (MX)

(73) Assignee: Instituto Mexicano del Petroleo, Mexico City (MX)

( * ) Notice: Subject to any disclaimer, the term of this patent is extended or adjusted under 35 U.S.C. 154(b) by 0 days.

(21) Appl. No.: 16/031,725

(22) Filed: Jul. 10, 2018

(65) Prior Publication Data

US 2019/0010409 A1    Jan. 10, 2019

(51) Int. Cl.
    *C10G 47/10* (2006.01)
    *B01J 21/12* (2006.01)
    (Continued)

(52) U.S. Cl.
    CPC .............. *C10G 47/10* (2013.01); *B01J 21/12* (2013.01); *B01J 32/00* (2013.01); *B01J 35/1019* (2013.01);
    (Continued)

(58) Field of Classification Search
    CPC .......... C10G 47/10; C08G 61/10; B01J 32/00; B01J 21/12; B01J 35/1019; B01J 35/1038; B01J 35/1057
See application file for complete search history.

(56) References Cited

U.S. PATENT DOCUMENTS 272,038 A    2/1883    Jambs
3,413,212 A    11/1968    Weisz
(Continued)

FOREIGN PATENT DOCUMENTS

CA    1122914 A1    5/1982
CA    1144501 A1    4/1983
(Continued)

*Primary Examiner* — Brian A McCaig
(74) *Attorney, Agent, or Firm* — Jason P. Mueller; FisherBroyles, LLP (57) ABSTRACT

The present invention relates to the process for preparing improved solid hydrogen transfer agents obtained from a polymer with units containing the structure of naphthalene, phenanthrene or anthracene, which exhibit activity as hydrogen transfer agents in any chemical reduction reaction involving the breaking of double bonds and in treatment, hydrotreatment and hydrodisintegration reactions of heavy and extra-heavy crude oils and of cuts and currents derived therefrom. These improved solid hydrogen transfer agents can be supported and not supported on metal oxides such as boehmite, alumina, silica, titania, kaolin and/or mixture thereof, in the presence of reducing agents such as hydrogen, methane, or natural gas. In addition, the application of these improved solid hydrogen transfer agents obtained from a polymer with units containing the structure of naphthalene, phenanthrene or anthracene, it allows to improve properties of the crudes such as viscosity, decrease in the formation of coke, increase in the yield of distillates and in API gravity. These hydrogen transfer agents, being solid, can be reused and recovered from the reaction medium; they also have a thermal stability such that it can carry out reactions at temperatures up to 450° C.

14 Claims, 3 Drawing Sheets

(51) Int. Cl.
  *B01J 32/00* (2006.01)
  *C08G 61/10* (2006.01)
  *B01J 35/10* (2006.01)

(52) U.S. Cl.
  CPC ....... *B01J 35/1038* (2013.01); *B01J 35/1057* (2013.01); *C08G 61/10* (2013.01); *C08G 2261/312* (2013.01); *C10G 2300/107* (2013.01); *C10G 2300/1077* (2013.01); *C10G 2300/302* (2013.01); *C10G 2300/308* (2013.01)

(56) References Cited

U.S. PATENT DOCUMENTS

| | | | |
|---|---|---|---|
| 4,016,106 A * | 4/1977 | Sawyer | B01J 23/882 502/254 |
| 4,294,686 A | 10/1981 | Fisher et al. | |
| 4,363,716 A | 12/1982 | Greene et al. | |
| 4,389,303 A | 6/1983 | Simo et al. | |
| 4,395,324 A | 7/1983 | Derbyshire et al. | |
| 4,485,004 A | 11/1984 | Fisher et al. | |
| 4,592,830 A | 6/1986 | Howell et al. | |
| 4,604,186 A | 8/1986 | Lutz et al. | |
| 4,615,791 A | 10/1986 | Choi et al. | |
| 4,640,765 A | 2/1987 | Kubo | |
| 4,642,175 A | 2/1987 | Rudnick | |
| 4,696,733 A | 9/1987 | Tsao | |
| 4,857,168 A | 8/1989 | Kubo et al. | |
| 4,966,679 A | 10/1990 | Kubo et al. | |
| 7,351,395 B1 * | 4/2008 | Pez | C01B 3/0015 206/0.7 |
| 7,594,990 B2 | 9/2009 | Satchell, Jr. | |

FOREIGN PATENT DOCUMENTS

| | | |
|---|---|---|
| CA | 1152924 A1 | 8/1983 |
| GB | 767592 A | 2/1957 |
| GB | 784136 A | 10/1957 |
| MX | 2014013477 A | 5/2016 |
| MX | 2015010173 A | 2/2017 |

* cited by examiner

PROCEDURE FOR PREPARATION OF IMPROVED SOLID HYDROGEN TRANSFER AGENTS FOR PROCESSING HEAVY AND EXTRA-HEAVY CRUDE OILS AND RESIDUES, AND RESULTING PRODUCT

CROSS-REFERENCE TO RELATED APPLICATIONS

This application claims priority to Mexican Patent Application Number MX/a/2017/009054, filed Jul. 10, 2017, the entire contents of which are hereby incorporated by reference herein and priority of which is hereby claimed.

TECHNICAL FIELD OF THE INVENTION

The present invention refers to the procedure for preparation of solid hydrogen transfer agents from a starting polymer having units containing the naphthalene, phenanthrene or anthracene structure (1), which may be supported on metallic oxides such as alumina, silica, titania, kaolin or a mixture of these, to be used in any hydrogenation reaction involving the saturation of compounds containing double bonds in their chemical structure and in the upgrading of heavy and extra-heavy crude oils and fractions derived from them by thermal or catalytic hydrotreatment. These solid hydrogen transfer agents improve the physical properties of crude oils such as API gravity, viscosity and distillates yields and prevent coke formation.

(1) Chemical Structure of the Polymer Having Units Containing the Naphthalene Structure in the Present Invention

BACKGROUND OF THE INVENTION

Unlike conventional crude oils, heavy crude oils have a low hydrogen/carbon ratio and a high heteroatoms content (nitrogen, sulfur and metals), particularly in the asphaltenes fraction. Heavy crude oils and bitumens have high viscosities and high densities (low API gravities), and present important problems in their transportation and processing, which may be solved by means of upgrading technologies, most of them based upon hydrogen addition or carbon rejection. The best-known technology based upon hydrogen addition is catalytic hydroprocessing, which may be carried out in a fixed-bed, moving-bed, ebullated-bed or dispersephase reactor.

At present, catalytic hydrocracking and thermal cracking are the technologies more frequently used to improve the properties of heavy crude oils. They are based upon the hydrogen addition and carbon rejection routes. However, they present drawbacks such as a low efficiency in the use of hydrogen, high coke formation and deposition on the reactor walls and on the catalyst, and low quality of products. The hydrogenation reactions are hampered by limited availability of hydrogen, which must be transferred to the liquid phase before the reaction, and by low hydrogen partial pressures. Solid hydrogen transfer agents prepared from a polymer having units containing the naphthalene structure are easily dehydrogenated, transferring hydrogen atoms to the heavy hydrocarbons in the crude oil, thus improving the crude oil flow properties, reducing its viscosity, increasing its API gravity and minimizing coke formation by inhibiting the polymerization reaction of heavy molecules, that proceeds via a free-radicals mechanism.

An alternative route for hydrogen addition is the use of hydrogen donors, or hydrogen transfer agents, which are chemical compounds that can easily transfer hydrogen atoms to the heavy crude oils. A variety of hydrogen donors have been reported in the technical literature, with different hydrogen transfer capabilities, costs and thermal stabilities. Some of them have been tested with model compounds and a few have been used in heavy crude oils upgrading.

Mexican Patent application MX/a/2014/013477 refers to the use of polymers or copolymers based on naphthalene, particularly polyester-type polymers having naphthalene units in their structure, for the cyclohexene and benzene hydrogenation reactions. Two polymers, Poly-(1,4-bis (1,5-naphthalenedioxy) benzene dicarboxylate) and Poly-(2,2'-bis (1,5-naphthalenedioxy) diphenyl dicarboxylate), were synthesized and tested in these hydrogenation reactions.

Mexican Patent application MX/a/2015/010173 refers to the use of polyester-type polymers (Poly-(1,4-bis (1,5-naphthalenedioxy) benzene dicarboxylate) and Poly-(2,2'-bis(1,5-naphthalenedioxy) diphenyl dicarboxylate)), both having naphthalene units in their structure, as solid hydrogen transfer agents in the hydrotreatment or hydrocracking of heavy hydrocarbons.

U.S. Pat. No. 3,413,212 describes a process for improving the properties of hydrocarbon fractions having boiling points above 204° C. using a crystalline aluminosilicate and a hydrogen transfer agent (hydrogen donor) in the 290-593° C. temperature range with the purpose of obtaining hydrocarbon fractions in the gasoline range. The hydrogen donor is preferably prepared by partial hydrogenation of polynuclear aromatic compounds, such as 1,2,3,4-tetrahydronaphthalene and decahydronaphthalene, and participates in the reaction following a hydrogen transfer mechanism in the presence of the catalytic material.

U.S. Pat. No. 4,642,175 refers to the reduction of coke formation in heavy hydrocarbons when treated with transition-metal naphthenates at temperatures below 350° C. The product shows an improved thermal stability and may be subsequently fed to catalytic or thermal cracking processes, including visbreaking and coking, with improved liquid products yields and lower coke production.

U.S. Pat. No. 4,395,324 describes the use of a low-boiling-point hydrogen transfer agent, of the tetralin type, in a cracking process.

U.S. Pat. No. 4,696,733 describes a process for total or partial hydrogenation of polynuclear aromatic compounds with manganese in the presence of hydrogen at high temperatures. The resulting partially hydrogenated compounds are useful as hydrogen transfer agents in thermal cracking processes.

U.S. Pat. No. 4,485,004 describes a process for the conversion of heavy hydrocarbons to lighter products by hydrocracking in the presence of a hydrogen transfer agent having a boiling point above 200° C. and a hydrogenation catalyst containing cobalt, molybdenum, nickel, tungsten or mixtures of these.

U.S. Pat. No. 7,594,990 B2 describes a process where a hydrogen donor solvent is used to maximize residue conversion in an ebullated-bed residue cracking process. The precursor of the hydrogen donor solvent is produced by hydroreforming reactions in the hydrocracking of residues. In this process the hydrogen donor solvent is effective in the inhibition of coke formation at high temperatures.

British Patent GB 767,592 describes a process and system for the conversion of crude oil into lighter products by thermal cracking of the oils in the presence of a hydrogen donor diluent, such as an aromatic fraction, where the purpose of the hydrogen donor is to transfer hydrogen to the heavier fractions to prevent coke formation in thermal cracking or coking operations.

British Patent GB 784,136 claims a thermal cracking process to obtain lighter products using hydrogen donor diluents constituted by hydrogenated hydrocarbons from a 260-593° C. boiling range fraction having substantial proportions of condensed ring aromatic hydrocarbons.

U.S. Pat. No. 3,413,212 describes a process for improving the properties of hydrocarbon fractions having boiling points above 204° C., using a hydrogen transfer agent and a crystalline aluminosilicate catalyst at 290-593° C. temperatures to obtain gasoline-range hydrocarbon fractions. The hydrogen transfer agent, preferably 1,2,3,4-tetrahydronaphthalene and decahydronaphthalene, is prepared by partial hydrogenation of polynuclear aromatic hydrocarbons following a hydrogen transfer mechanism in the presence of the catalytic material.

Canadian Patent CA 1,122,914 describes a process for improving the properties of heavy hydrocarbon oils, such as specific gravity, viscosity and boiling point, using a hydrogen transfer agent at hydrocracking conditions, where a product fraction having an 82-177° C. boiling range is rehydrogenated and recycled to the hydrocracking zone at a 300-570° C. temperature. An 11.1° API bitumen is converted into a 19.3° API crude oil.

Canadian Patent CA 1,144,501 describes a process for upgrading a heavy oil by mixing with a hydrogen donor diluent and submitting to catalytic cracking to obtain higher-value hydrocarbons. A gasoil fraction from the catalytic cracking process is hydrogenated and mixed with the heavy oil fed to this process.

Canadian Patent CA 1,152,924 describes a process for the conversion of a high-boiling point crude oil containing metals and at least 5% of asphaltenes into an upgraded crude oil, using a hydrogen donor solvent at a pressure of 40-200 bar, a temperature of 400-450° C. and an LHSV of 0.8-1.5 $h^{-1}$.

U.S. Pat. No. 4,294,686 describes a process for upgrading heavy crude oils by mixing with a hydrogen donor diluent (hydrogenated light cycle oil) and submitting to catalytic cracking at a pressure of 2.5-6 MPa, a temperature of 400-460° C. and an LHSV of 0.8-7.0 $h^{-1}$ to obtain higher-value hydrocarbons. A gasoil fraction from this process is hydrogenated and afterwards mixed with the heavy oil.

U.S. Pat. No. 4,363,716 claims the use of a hydrogen donor solvent based upon tetralin and naphthalene to upgrade heavy hydrocarbons by conversion to lighter products at temperatures of 250-800° C. and residence times between 15 seconds and 5 hours. The fraction of the reaction product boiling in the 175-300° C. range is separated and hydrogenated over a metallic catalyst to generate the hydrogen donor solvent.

U.S. Pat. No. 4,389,303 claims a hydrovisbreaking process for the conversion of a high boiling point crude oil into light products using a naphthenic base 200-500° C. boiling range distillate as a hydrogen donor solvent at a pressure of 40-200 bar, 400-450° C. and an LHSV of 0.5-2 $h^{-1}$.

U.S. Pat. No. 3,413,212 describes a process for the upgrading of hydrocarbon fractions having a boiling point above 204° C., by catalytic conversion of these feedstocks in the presence of a hydrogen transfer agent and of a high-activity cracking catalyst at a temperature of 290-593° C. The hydrogen transfer agent, preferably constituted by 1,2,3,4-tetrahydronaphthalene and decahydronaphthalene, is generated by partial hydrogenation of polynuclear aromatic compounds.

U.S. Pat. No. 4,389,303 refers to a crude oil hydrovisbreaking process at temperatures of 400-450° C., without a catalyst and in the presence of a hydrogen donor solvent, derived from the same or a similar crude oil and molecular hydrogen. The conversion of high-boiling-point crude oils with high contents of residue, metals and asphaltenes (>5%) is accomplished at a pressure of 120-150 bar, LHSV of 0.8-1.5 kg/l-h and a gas recycle between 400 and 2000 $m^3$/MT. Naphthalene concentration is kept constant in the recycle system and in the hydrovisbreaking section, promoting the conversion of residue into distillates, by means of a hydrogen molecular rearrangement.

U.S. Pat. No. 4,363,716 refers to a short residence time (10 min-5 h) cracking process at 250-475° C., that improves the properties of heavy fractions favoring cracking selectivity towards distillates and inhibiting coke formation by means of a $C_{10}$-$C_{14}$ hydrogen donor solvent, obtained in the same process and subjected to hydroprocessing before being recycled into the reaction zone; tetralin, alkyltetralins, dihydronaphthalene and dihydroalkylnaphthalenes are particularly identified as active hydrogen agents. The recycled material hydroprocessing is a hydrogenation using a solid base metal catalyst (Ni—Mo, Co—Mo, Ni—W) or a hydrogenation-hydroisomerization using a solid acid catalyst (Si—Al, Si—Mg—Si—Al—Zr, acid crystalline zeolites, phosphoric acid on kieselguhr), to promote the formation of two-ring hydrogenated aromatic compounds having a 175-300° C. boiling range, up to 30 wt. %.

U.S. Pat. No. 4,592,830 refers to a hydrovisbreaking process for heavy fractions having a boiling point above 538° C., using a hydrogen donor solvent (tetralin) obtained in the same process. By heating the feedstock, hydrogen and the solvent under hydrovisbreaking conditions (380-480° C.), a partial conversion of the heavy residue is achieved. Molybdenum compounds, such as dithiophosphates or dithiocarbamates, are used as catalysts at a 1,000 ppm concentration on a total feedstock plus solvent basis. Reaction time up to 10 h, preferably 3 h, and an operating pressure of 500 to 3,000 psig are used in this process. The use of the hydrogen donor solvent leads to a lower coke deposition than conventional hydrovisbreaking.

U.S. Pat. No. 4,604,186 refers to a process for the reduction of coke formation in a visbreaker-delayed or fluid coker system, using a hydrogenated heavy oil fraction (b.p. 370-510° C.) as a hydrogen transfer agent added to the feed to this system; the amount of hydrogen transfer agent added to the feed controls the amount of coke produced. The heavy fraction of the visbreaker effluent is the feed to the coker and the aromatic gasoil fraction from the coker is hydrogenated and recycled to the visbreaker as a hydrogen transfer agent. Operating temperatures for the visbreaker and coker are 370-510° C. y 427-525° C., respectively. Hydrogenated gasoil is mixed with the feedstock to this system in a 0.2-2 wt. % proportion.

U.S. Pat. No. 4,615,791 refers to a heavy oil residue visbreaking process having an Equivalent Reaction Time of 800 s at 427° C., in the absence of free hydrogen and in the presence of highly aromatic hydrogen transfer agents in a 0.1-50 wt. % proportion, to obtain a low-viscosity product; the amount of hydrogen transfer agent is preferably 20 wt. % with respect to the heavy oil residue. The hydrogen transfer agents may come from the FCC unit or be derived from a non-oil source. The visbreaker operates at a severity between 500 and 800 seconds (ERT), at temperatures between 350-485° C. and with residence times between 1 and 60 minutes. The amount of hydrogen transfer agent is 0.1 to 20 wt. % with respect to the heavy oil residue.

U.S. Pat. No. 4,640,765 reveals a method for cracking heavy crude oils with at least 1 wt. % asphaltenes avoiding high pressure drops in the fractionation towers due to coking. The authors describe a series of measures including: a) dividing the inside of the fractionation tower in at least two sections, communicated at the top of the column; b) introducing the heavy crude oil, the hydrogen transfer agent and gaseous hydrogen into the column; c) circulating the fluid maintaining a temperature of 380-470° C., a pressure of 30-150 kg/cm$^2$ and a flow velocity above 1 cm/s, at a residence time between 0.2 and 10 h. The hydrogen transfer agent is defined as a fraction containing at least 30 wt. % of the hydrides of polycyclic aromatic hydrocarbons. The appropriate catalyst is Group VII and VI metallic oxides or sulfides on alumina, silica, Si—Al, Al—B, Si—Al—B, Si—Al—Mg, Si—Al—Ti or natural or synthetic zeolites in a continuous process at 5-100 cm/s with a preferred residence time of 30 min. The fluid is discharged at the top of the column and the solvent fraction is recycled.

U.S. Pat. No. 272,038 presents a process for cracking a heavy oil fraction with an asphaltenes content of 1% using a hydrodemetallizing and hydrodesulfurizing catalyst, 20 vol. % max., and a hydrogen transfer agent such as tetralin, with a >30% aromatics content. The recycle of gaseous hydrogen inhibits coke formation. Reaction products are hydrogenated in the presence of a solid catalyst under hydrogen flow to prevent plugging. Crude oil and solvent are circulated at a velocity of 2 cm/s, maximum LHSV 1 h$^{-1}$ (crude oil/catalyst). Temperature and pressure in the cracking reactor are maintained between 380-470° C. and 30-150 kg/cm$^2$ respectively, and temperature and pressure in the hydrogenation reactor are 330-440° C. and 30-150 kg/cm$^2$.

U.S. Pat. No. 4,857,168 describes a process for the hydrocracking of heavy crude oil fractions using a hydrogen transfer agent as a solvent, gaseous hydrogen and a hydrogenating catalyst in a reactor operating at a temperature of 380-470° C. and a pressure of 30-150 kg/cm$^2$. The hydrogen transfer agent inhibits the formation of carbonaceous deposits and the concentration of tetralin is kept at a fixed level or greater. The process applies to feedstocks with asphaltenes content of 10-30 wt. % and 50% boiling at a temperature of 350° C. The catalyst has a demetallizing function and both reactors (cracking and hydrogenation) are of the fixed-bed type.

U.S. Pat. No. 4,966,679 claims a process for hydrocracking heavy crude oil fractions into lighter products in a cracking reactor with a suitable catalyst, a hydrogen transfer agent (tetralin) and hydrogen addition. The hydrogenation of the reaction products in the presence of a solid catalyst and under hydrogen flow leads to the conversion of toluene insolubles into toluene solubles, avoiding plugging of process equipment. Cracking catalyst volume is 50-70% and hydrogenation catalyst volume is 60-95%. Liquid linear velocity is set at 3.5 cm/s to avoid high pressure drops. 20 vol. % of catalyst is placed in one reactor partition and the oil and solvent are circulated at a velocity of 2 cm/s. The hydrogen transfer agent contains at least 30 wt. % of the hydrides of polycyclic aromatic compounds. The cracking reactor contains a hydrodemetallizing catalyst operating at 380-470° C. and 30-150 kg/cm$^2$ and the hydrogenation reactor contains a hydrodesulfurizing catalyst operating at 330-440° C. and 30-150 kg/cm$^2$.

U.S. Pat. No. 4,592,830 refers to a hydrovisbreaking process for heavy fractions having a boiling point above 538° C., using a hydrogen donor solvent (tetralin) obtained in the same process. By heating the feedstock, hydrogen and the solvent under hydrovisbreaking conditions (380-480° C.), a partial conversion of the heavy residue is achieved. Molybdenum compounds, such as dithiophosphates or dithiocarbamates, are used as catalysts at a 1,000 ppm concentration on a total feedstock plus solvent basis. Reaction time up to 10 h, preferably 3 h, and an operating pressure of 500 to 3,000 psig are used in this process. The use of the hydrogen donor solvent leads to a lower coke deposition than conventional hydrovisbreaking.

The use of liquid hydrogen transfer agents such as tetralin or decalin to avoid coke formation in crude oils upgrading, as described in the above-mentioned Patents, is well known; however, these compounds are expensive and their recovery and recycle is difficult. This disadvantage may be overcome by the use of solid hydrogen transfer agents, such as those described in Mexican Patent Application MX/a/2014/013477 that refers to the use of naphthalene-based polymers or copolymers, particularly polyester-type polymers having naphthalene units.

In the present invention we describe the procedure for the preparation of improved solid hydrogen transfer agents for heavy crude oils upgrading, derived from polymers having in their structure naphthalene, phenanthrene or anthracene units and possessing improved thermal and chemical stability and textural properties, higher activity and lower coke formation than those described in Mexican Patent Application MX/a/2014/013477.

The improved solid hydrogen transfer agents, object of this invention, show higher melting or decomposition temperatures than those described in Mexican Patent Application MX/a/2014/013477. The polymers having in their structure naphthalene, phenanthrene or anthracene units described in the present invention may be used by themselves or admixed with an inert support and show the following textural properties when they are mixed with a Boehmite for industrial application.

It is therefore an advantage of this invention the application of these improved solid hydrogen transfer agents derived from polymers having in their structure naphthalene, phenanthrene or anthracene units as hydrogen transfer agents for carrying out hydrogenation reactions in general and any chemical reaction that involves a double bond reduction.

TABLE 1

Textural properties of improved solid hydrogen transfer agents from the present invention.

|  | Boehmite | Improved hydrogen transfer agent |
|---|---|---|
| Specific area, $m^2/g$ | 300 | 128 |
| Pore volume, $cm^3/g$ | 0.436 | 0.164 |
| Pore diameter, Å | 23 | 19 |

Another advantage of this invention is the application of these improved solid hydrogen transfer agents derived from polymers having in their structure naphthalene, phenanthrene or anthracene units as solid hydrogen transfer agents for carrying out thermal treatment, hydrotreatment or hydrocracking reactions in heavy and extra-heavy crude oils and products derived from them.

The procedure for the preparation of improved solid hydrogen transfer agents derived from polymers having in their structure naphthalene, phenanthrene or anthracene units, object of this invention, is an alternative for any reaction involving the reduction of double bonds; another advantage of this invention is the application of these improved solid hydrogen transfer agents to inhibit the polymerization reactions of coke precursors during the thermal treatment of heavy and extra-heavy crude oils.

BRIEF DESCRIPTION OF THE INVENTION DRAWINGS

With the purpose of better understanding the procedure for the preparation of the improved solid hydrogen transfer agents derived from polymers having in their structure naphthalene, phenanthrene or anthracene units, object of the present invention, we will refer to the accompanying figures, without limiting the scope of the invention.

DETAILED DESCRIPTION OF THE INVENTION

Description

The present invention relates to the process for the preparation of solid hydrogen transfer agents from a polymer with units containing the structure of naphthalene, phenanthrene or anthracene (1), which may be supported on metal oxides such as alumina, silica, titania or kaolin and/or mixture thereof, for use in any hydrogenation reaction involving the saturation of compounds containing double bonds in their chemical structure and in the improvement of heavy and extra heavy crudes, in thermal treatment and hydrotreating reactions of heavy and extra-heavy crudes, residua and cuts and streams derived from it. These solid hydrogen transfer agents improve physical properties of crude oils such as API gravity, viscosity, increased distillate yield and prevent coke formation.

The solid hydrogen transfer agents, another of the objects of the present invention are prepared from a polymer with units containing the structure of naphthalene, phenanthrene or anthracene; these can be anchored or in physical mixture with metallic oxides such as alumina, silica, titania or kaolin, or a mixture of them, their application extends in any chemical reaction involving a reduction and for the thermal treatment, hydrotreating or hydrocracking of heavy hydrocarbons, such as heavy or extra-heavy crudes and residues from the distillation of oil and from cuts and currents derived therefrom. These hydrogen transfer agents, because they are solids, can be recovered from the reaction medium for later reuse, and have a thermal stability that allows to carry out reactions at temperatures up to 450° C. These solid hydrogen transfer agents improve properties of heavy crudes such as API gravity, viscosity, increase in distillate yield and decrease coke formation during thermal treatment, hydrotreatment and/or thermal cracking reactions.

The improved solid hydrogen transfer agents obtained from a polymer with units containing the structure of naphthalene, anthracene or phenanthrene, object of the present invention is an alternative to perform any chemical reaction involving the reduction of double bonds. The reduction reactions are limited by the availability of hydrogen that must be transferred to the liquid before starting the hydrogenation reaction, and by the hydrogen partial pressure; the improved solid hydrogen transfer agents of this invention provide an additional amount of hydrogen atoms to carry out hydrogenation reactions, since the naphthalene units present in their composition present a hydrogenation-dehydrogenation equilibrium.

The present invention relates to the process for the preparation of improved solid hydrogen transfer agents of the naphthalene type, but more particularly improved solid hydrogen transfer agents obtained from a polymer with units containing the structure of naphthalene and an inert support, as described in the chemical structure (1). This polymer with units containing the structure of naphthalene, presents activity as a hydrogen transfer agent any reduction reaction of chemical double bonds between two carbon atoms, as in the case of the asphaltenes present in high concentration in the heavy and extra-heavy crudes; the solid hydrogen transfer agents, obtained from a polymer with units containing the structure of naphthalene, phenanthrene or anthracene, have a melting and/or decomposition point above 450° C., when they are supported or extruded, it is possible to improve their textural properties such as hardness and surface area by mixing with clay materials and/or metal oxides such as alumina, silica, titania or kaolin. In addition, the present invention describes the use of these improved solid hydrogen transfer agents in any chemical reaction involving reduction of chemical functional groups, in the presence of a reducing gas such as hydrogen, and in the thermal treatment of heavy and extra-heavy crudes and products or fractions obtained from them.

A feature of this invention is that the process for preparing the improved solid hydrogen transfer agents is carried out in two stages: the first consists of the physical mixture of a polymer with units containing the structure of naphthalene with an inert support such as boehmite, kaolin and silica and/or a mixture of them and the second is to activate the material in the form of extrudate for use as a hydrogen donor.

Furthermore, the present invention has as a characteristic that the improved solid hydrogen transfer agents when subjected to a reducing environment such as hydrogen, methane or any hydrocarbon stream in the gas phase, as in the case of natural gas, reduces the naphthalene rings present in the polymer used as a raw material in the preparation of the hydrogen donor, to partially hydrogenated rings with a structure similar to tetralin under the conditions of appropriate pressure and temperature.

Additionally, a feature of the present invention is that since the hydrogen transfer agents of the present invention are solids, they can be recovered for later use in a practical manner, unlike liquid hydrogen transfer agents such as tetralin or decalin.

Therefore, the present invention relates to the process of preparing improved solid hydrogen transfer agents, which present activity as hydrogen donors for reduction reactions of unsaturated compounds in general and hydrocracking of high molecular weight molecules in molecules of lower molecular weight in a fixed bed inside a batch or continuous flow reactor that allows to develop the reduction and hydroprocessing reactions and wherein the properties of the solid hydrogen transfer agents, prepared from polymers with units containing the naphthalene structure, have a melting and/or decomposition point above 450° C., present chemical stability of the structure (functional groups), have the possibility of improving textural properties by means of mixtures with clay materials when supported and not supported by metallic oxides such as alumina silica, titania or kaolin and can be manufactured from commercial and economic raw materials with easily scalable preparation processes. In addition, the present invention describes the application of improved solid hydrogen transfer agents prepared from a polymer with units containing the structure of naphthalene, phenanthrene or anthracene in thermal hydrotreating reactions of heavy and extra-heavy crude oil and of cuts and currents derived therefrom, in the presence of reducing agents such as hydrogen.

The process for preparing improved solid hydrogen transfer agents with units containing the structure of naphthalene, phenanthrene or anthracene, object of the present invention considers the following steps: a) Preparation of the raw materials: pulverize in a porcelain mortar AlO (OH) also known as Boehmite, $SiO_2$, or $Al_2O_3$ or kaolin, selecting the Boehmite and a polymer with units containing the structure of naphthalene, phenanthrene or anthracene, preferably naphthalene, sieved raw materials through a 165 mesh 165 (0.089 mm); b) Preparation of the physical mixture: 60 to 100 g of grinded and sieved Boehmite are added from 20 to 100 ml of distilled water and mixed to form a paste, subsequently, it is peptized by adding 10-50 ml of an aqueous solution of nitric acid at 5% by volume to form a gel; c) Mixed with the gel obtained, add 10 to 100 g of a polymer with units containing the naphthalene structure, until a material with adequate properties for extrusion is obtained; d) Extrusion of the physical mixture AlO (OH)-polymer resin. The paste obtained in section b), is placed in a mechanical extrusion system at a constant speed, the extrudates are received in metal trays e) Drying. The extrudates are dried 12 hours at room temperature; and, f). Preparation of solid hydrogen transfer agents for activation. The material is cut to the desired length and left in an oven at 90° C. for 12 hours.

The improved solid hydrogen transfer agent obtained in the present invention possesses the following technical characteristics: a specific area between 100-300 $m^2/g$, pore volume between 0.15 and 0.20 $cm^3/g$ and pore diameter 15 to 19 Å, average molecular weight between 300 and 1000 g/mol with thermal stability at 800° C. between 60 and 90% by weight of the original material and chemical stability at temperatures above the temperatures (450° C.) of hydrogen transfer reaction.

The process for improving heavy, extra-heavy crudes or residues in which the improved solid hydrogen transfer agent obtained in the present invention is used, comprises: a) contacting the improved solid hydrogen transfer agent with a heavy, extra heavy crude or residue load of 9 to 12° API and viscosity of 5.968 cSt measured at 37.8° C. at a temperature of 350 to 450° C. at a pressure of 50 to 100 $Kg/cm^2$ wherein the hydrogen transfer reactions are carried out in the presence of a reducing agent, such as hydrogen, methane or natural gas; b) obtain heavy or extra-heavy crudes or residues with an increase in API gravity from 3 to 6 units, a decrease in viscosity up to 100 cSt determined at 37.8° C. and an increase in the yield of distillates determined by TBP (True Boiling Point) naphtha and intermediate distillates, mainly between 10-20% by volume.

EXAMPLES

Below are presented examples related to the preparation process of improved solid hydrogen transfer agents with units containing the structure of naphthalene, phenanthrene or anthracene, object of the present invention and described above, without these examples limit the scope of the present invention.

Example 1. Preparation of the Improved Heterogeneous Hydrogen Donor

This example shows the procedure for the preparation of the improved heterogeneous hydrogen donor (1).

In a porcelain mortar, AlO (OH), also known as Boehmite, and a polymer with units containing the naphthalene structure of molecular weight between 500 and 1000 g/mol are grinded and then sieved through 165 mesh (0.089 mm). At 60 g grinded and sieved Boehmite, 20 to 100 ml of distilled water are added and mixed until a paste is formed, then 10-50 ml of an aqueous solution of 5% by volume nitric acid are added to form a gel. To this mixture is added stepwise from 10 to 100 g of a polymer with units containing the naphthalene structure, until a material with suitable properties for extruding is obtained.

Extrusion of the physical mixture AlO (OH)—Polymeric resin. The paste obtained in section a) is placed in a mechanical extrusion system at a constant speed, the extrudates are received in metal trays and left to dry for 12 hours at room temperature. The material is cut to the desired length and left in an oven at 90° C./12 hours.

Example 2. Conditioning and Activation of the Improved Heterogeneous Hydrogen Donor in a Pilot Plant In this section, as the sequence of example 1, the procedure for the thermal treatment and activation of the solid hydrogen transfer agent carried out in a pilot plant for the hydrotreating of heavy crude oils is described.

a) Conditioning of the improved solid hydrogen transfer agent.

1. In a fixed-bed reactor, the improved solid hydrogen transfer agent is placed, a leak test using $N_2$ is carried out at a pressure of 40 to 80 Kg/cm$^2$.

2. The reactor is heated from 50 to 120° C., feeding a nitrogen flow between 100-500 ml/min, at atmospheric pressure. These conditions are maintained by 2-6 h 3. The temperature is increased from 400° C. to 450° C. and the pressure from 40 to 70 kg/cm$^2$, maintaining a flow of $N_2$ between 100-500 ml/min. These conditions are maintained for 10-24 hours.

4. The temperature is lowered to 120° C., the system is depressurized to atmospheric pressure maintaining the same flow of nitrogen. Maintain these conditions for 2-6 hours.

b) Activation of the improved solid hydrogen transfer agent

1. The nitrogen flow is replaced by hydrogen of 100-500 ml/min, the pressure is increased from 40 to 70 Kg/cm$^2$ and the temperature between 100 and 240° C. at a speed of 20° C./hour. Maintain these conditions for 2 to 6 hours.

2. The temperature is reduced to 120° C. at a speed of 50° C./hour, maintaining the same hydrogen flow and system pressure. When reaching 120° C., replace the flow of $H_2$ with $N_2$. Maintain conditions from 1 to 5 hours.

3. The pressure of the system is reduced to atmospheric maintaining the nitrogen flow between 100 and 500 ml/min. Maintain conditions between 2-6 hours. Elapsed the time, decrease the temperature to room temperature at a speed of 50° C./hour, maintaining the flow of $N_2$.

Example 3. Thermal Stability of the Improved Solid Hydrogen Transfer Agents

Gravimetric Thermal Analysis (TGA).

Figure 1:
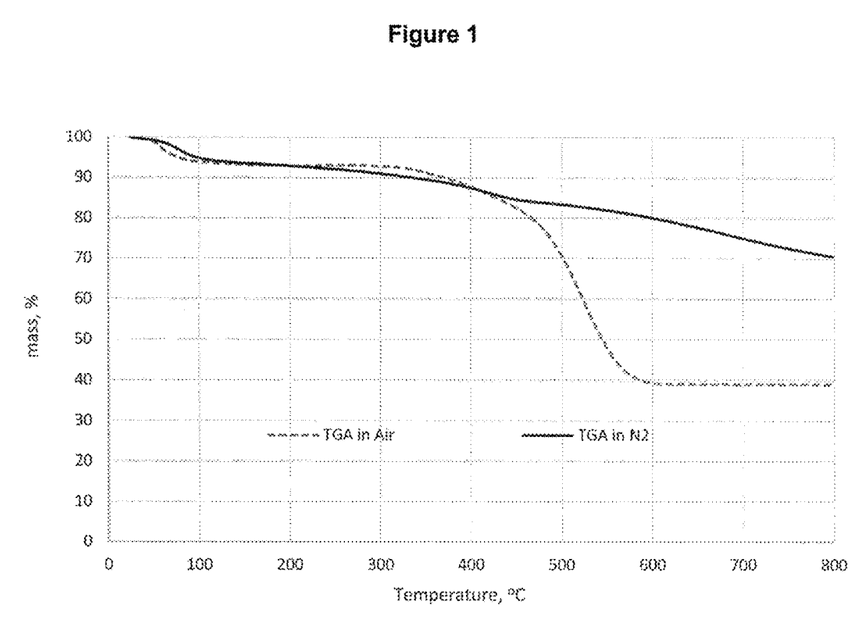
In FIG. 1 we show a Thermogravimetric Analysis (TGA) of an improved solid hydrogen transfer agent in nitrogen atmosphere and in air atmosphere.

To know the thermal stability of the improved solid hydrogen transfer agents, it was subjected to a thermal treatment of room temperature at 800° C. with a heating rate of 2.5° C./min. It was carried out in a nitrogen atmosphere and in an air atmosphere (FIG. 1). The behavior of the material in air and nitrogen atmosphere is very similar in the range of ambient temperature to 450° C. The improved solid hydrogen transfer agent loses about 8% by weight at 100° C. (water), after 450° C. the material begins to decompose, in an air atmosphere the decomposition is rapid due to the combustion of the organic polymer deposited; the remaining mass at 580° C. corresponds to the inorganic material AlO (OH). In an inert atmosphere, decomposition is gradual and incomplete at 800° C. and 70% by weight of the original material.

Example 4. Determination of the Average Molecular Weight of the Improved Solid Hydrogen Transfer Agent of the Example 1

By gel permeation chromatography, the average molecular weight of the organic components of the improved solid hydrogen transfer agent was determined. The sample was diluted in tetrahydrofuran and injected to a chromatograph, the result corresponds to the analysis of the solubilized fraction of the material in tetrahydrofuran. Results are shown in table 2.

TABLE 2

Molecular weight of the improved solid hydrogen transfer agent

| | Average MW, g/mol |
|---|---|
| Improved solid hydrogen transfer agent | 600-700 |

Figure 2:
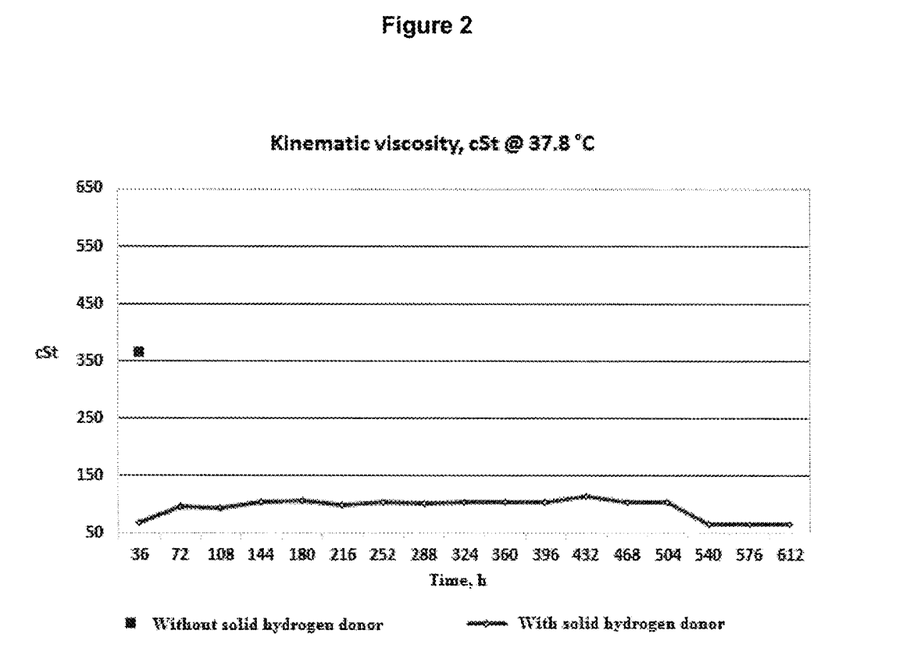
In FIG. 2 we show the kinematic viscosity (cSt) results of samples of upgraded crude oils obtained in a pilot plant where the reactor was packed with an improved solid hydrogen transfer agent having in its structure naphthalene units, using a 10.7° API crude oil as feedstock and hydrogen as a reducing agent.

Example 5. Effect of Improved Solid Hydrogen Transfer Agents in Hydrotreating a Heavy Crude In a pilot plant for the hydrotreatment of heavy crude oils, a test lasting 26 days was carried out, loading the reactor with the improved solid hydrogen transfer agent object of the invention, using a feedstock consisting of a heavy oil of 10.7° API and viscosity of 5.968 cSt measured at 37.8° C. (FIG. 2). The results obtained were the following:
 3 degrees in API gravity gaining
 Viscosity of the improved crude from 100 cSt to 37.8° C. during the entire test
 Coke formation with the improved hydrogen donor of 0.1% weight based on the crude processing (0.5% weight in the test without hydrogen donor).

Figure 3:
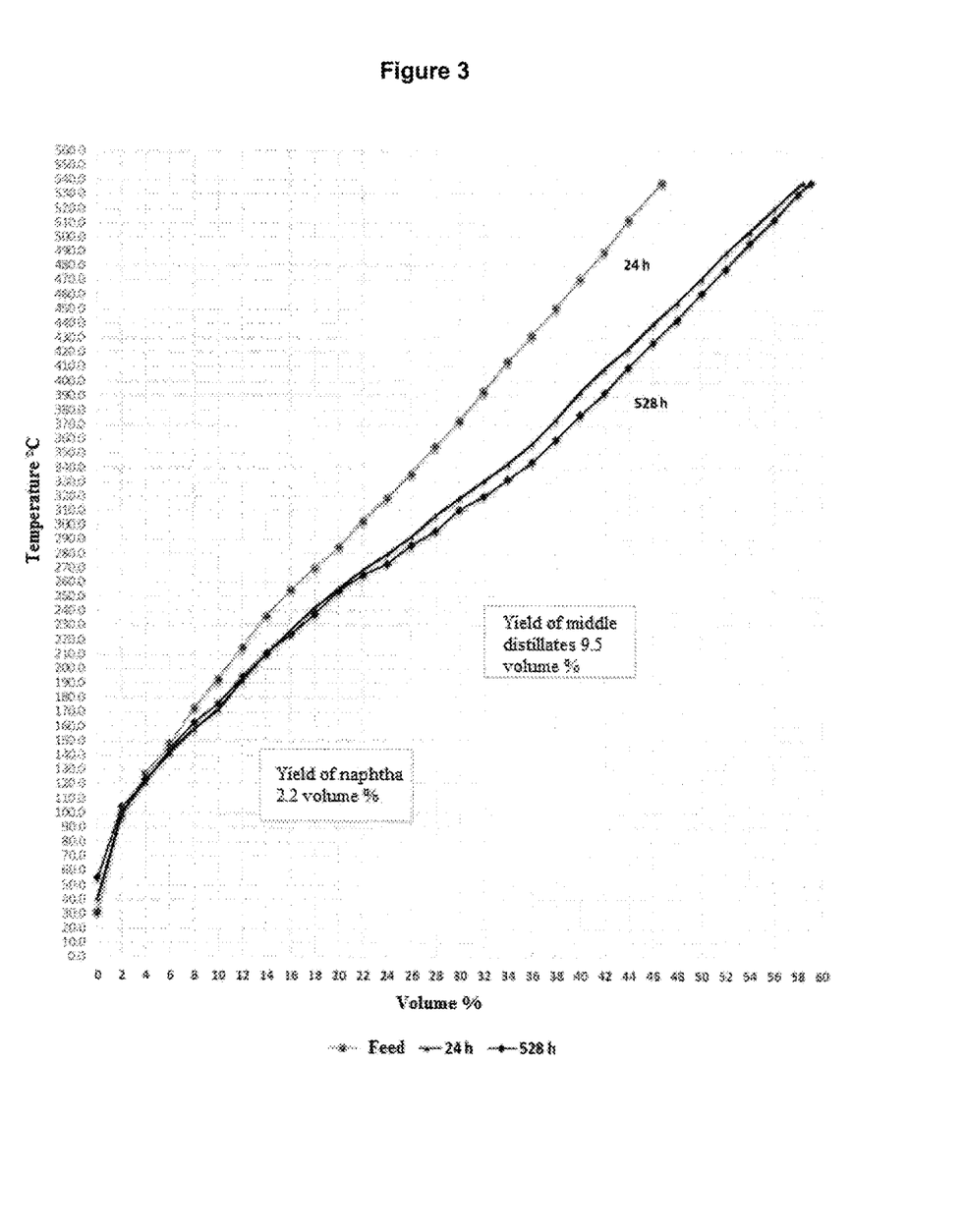
In FIG. 3 we show the TBP distillation results of samples of upgraded crude oils obtained in a pilot plant where the reactor was packed with an improved solid hydrogen transfer agent having in its structure naphthalene units, using a 10.7° API crude oil as feedstock and hydrogen as a reducing agent.

Example 6. Increase in Distillates Due to the Effect of Improved Solid Hydrogen Transfer Agents in the Hydrotreatment of a Heavy Crude In a pilot plant for the hydrotreatment of heavy crude oils, a test lasting 26 days was carried out, packing the reactor with the improved solid hydrogen transfer agent object of the invention, using a feedstock consisting of a heavy crude of 10.7° API and viscosity of 5.968 cSt measured at 37.8° C. The crude oil used as a feedstock and two samples of improved crudes obtained from the test at the beginning and at the end of the test were subjected to a TBP distillation (True Boiling Point, FIG. 3) to quantify the increase in distillates obtained with the solid hydrogen transfer agent object of the invention. The results obtained are illustrated in table 3:

TABLE 3

Increase in distillates.

| | FEED | upgraded crude oil Time on stream Yields (% vol) | |
|---|---|---|---|
| | (% vol) | 24 h | 528 h |
| Naphta (0-221° C.) | 12.45 | 15.13 | 15.38 |
| Intermediate distillates (221-360° C.) | 16.11 | 21.22 | 22.62 |
| 360-538° C. | 18.15 | 22.07 | 21.04 |
| Residue | 53.29 | 41.58 | 40.96 |

The invention claimed is:

1. A process for preparing improved solid hydrogen transfer agents for the processing of heavy or extra-heavy crudes or residues, comprising:
 a) preparing raw materials by grinding one of AlO (OH) ("Boehmite"), SiO$_2$, Al$_2$O$_3$, and kaolin, or a mixture thereof, with an organic macromolecule featuring fused aromatic rings, said organic macromolecule having a melting or decomposition point above 450° C. when supported or extruded, while sieving the raw materials through a 165 mesh (0.089 mm), resulting in a physical mixture;

b) adding distilled water to the physical mixture and mixing until the mixed distilled water and physical mixture forms a paste, and subsequently peptizing the paste by adding an aqueous solution of nitric acid of 5% by volume to form a gel;

c) mixing the gel with a naphthalene polymer that may be supported on a metal oxide, resulting in a resin material with adequate properties for extruding;

d) extruding the resin by a mechanical extrusion system at a constant speed, and receiving the extrudates in metal trays;

e) drying the extrudates for a time period of about 12 hours to about 24 hours at room temperature, resulting in solid hydrogen transfer agents;

f) preparing the solid hydrogen transfer agents for activation by cutting the transfer agents to a length in a range of about 0.5 cm to about 1.2 cm and leaving the transfer agents in an oven at a temperature of about 90° C. to about 120° C. for a time period of about 12 hours to about 24 hours; and g) loading the material obtained in part f) into a continuous flow reactor where a hydrogen flow of about 100 ml/min to about 150 ml/min, a pressure of about 40 kg/cm2 to about 70 kg/cm2, and a temperature between about 100° C. and about 500° C. is passed for a time of about 10 hours to about 24 hours.

2. The process according to claim 1, further comprising:

h) contacting the solid hydrogen transfer agent with a heavy, extra-heavy crude or residue of about 9° API to about 12° API and viscosity of about 5968 cSt, measured at 37.8° C., at a temperature of about 350° C. to about 450° C., at a pressure of about 50 kg/cm$^2$ to about 100 kg/cm$^2$ in hydrogen transfer reactions, where the hydrogen transfer reactions are carried out in the presence of a reducing agent selected from a group consisting of hydrogen, methane, and natural gas; and i) obtaining heavy or extra-heavy crudes or residues with an increase in API gravity from 3 to 6 units, a decrease in viscosity up to about 100 cSt determined at 37.8° C. and an increase in the yield of distillates, naptha and intermediate distillates, determined by TBP (True Boiling Point), wherein the solid hydrogen transfer agent has a specific area between about 100 m$^2$/g to about 300 m$^2$/g, a pore volume between about 0.15 cm$^3$/g and about 0.20 cm$^3$/g and a pore diameter of about 15 Å to about 19 Å, and an average molecular weight between about 300 g/mol and about 1000 g/mol with a thermal stability at about 800° C. between about 60% and about 90% by weight of the original material and chemical stability at a temperature up to about 450° C.

3. The process according to claim 1, wherein the raw materials comprise Boehmite mixed with a polymer with units containing the structure of naphthalene.

4. An improved solid hydrogen transfer agent, obtained by a process comprising:

a) preparing raw materials by grinding one of AlO (OH) ("Boehmite"), SiO$_2$, Al$_2$O$_3$, and kaolin, or a mixture thereof, with an organic macromolecule featuring fused aromatic rings, said organic macromolecule having a melting or decomposition point about 450° C. when supported or extruded, while sieving the raw materials through a 165 mesh (0.089 mm), resulting in a physical mixture;

b) adding distilled water to the physical mixture and mixing until the mixed distilled water and physical mixture forms a paste, and subsequently peptizing the paste by adding an aqueous solution of nitric acid of 5% by volume to form a gel;

c) mixing the gel with a naphthalene polymer that may be supported on a metal oxide, resulting in a resin material with adequate properties for extruding;

d) extruding the resin by a mechanical extrusion system at a constant speed, and receiving the extrudates in metal trays;

e) drying the extrudates for a time period of about 12 hours to about 24 hours at room temperature, resulting in solid hydrogen transfer agents;

f) preparing the solid hydrogen transfer agents for activation by cutting the transfer agents to a length in a range of about 0.5 cm to about 1.2 cm and leaving the transfer agents in an oven at a temperature of about 90° C. to about 120° C. for a time period of about 12 hours to about 24 hours; and g) loading the material obtained in part f) into a continuous flow reactor where a hydrogen flow of about 100 ml/min to about 150 ml/min, a pressure of about 40 kg/cm2 to about 70 kg/cm2, and a temperature between about 100° C. and about 500° C. is passed for a time of about 10 hours to about 24 hours, wherein the solid hydrogen transfer agent has a specific area between about 100 m$^2$/g to about 300 m$^2$/g, a pore volume between about 0.15 cm$^3$/g and about 0.20 cm$^3$/g and a pore diameter of about 15 Å to about 19 Å, and an average molecular weight between about 300 g/mol and about 1000 g/mol with a thermal stability at about 800° C. between about 60% and about 90% by weight of the original material and chemical stability at a temperature up to about 450° C.

5. The improved solid hydrogen transfer agent of claim 4, wherein the raw materials comprise Boehmite mixed with a polymer with units containing the structure of naphthalene.

6. A method for preparing an improved solid hydrogen transfer agent and upgrading of heavy or extra-heavy crudes or residua, comprising:

obtaining the solid hydrogen transfer agent from a combination comprising one organic polymer and an inorganic compound, wherein the organic polymer contains structural units based on the structure of one of naphthalene, phenanthrene, or anthracene, and has a melting or decomposition point above 450° C. when supported or extruded;

wherein the inorganic compound is a metal oxide; and wherein the upgrading of heavy or extra-heavy crude oil or residua is carried out by hydrotreatment.

7. The method of claim 6, wherein the organic polymer is physically mixed with the inorganic compound.

8. The method of claim 6, wherein the inorganic compound is selected from a group consisting of AlO(OH) ("Boehmite"), SiO$_2$, Al$_2$O$_3$, and kaolin.

9. The method of claim 6, wherein the organic polymer has a molecular weight average between about 600 g/mol and about 1200 g/mol.

10. The method of claim 6, wherein the improved solid hydrogen transfer agent has a specific area between about 100 m$^2$/g to about 300 m$^2$/g, a pore volume between about 0.1 cm$^3$/g and about 0.60 cm$^3$/g and a pore diameter of about 15 Å to about 20 Å, with a thermal stability and a chemical stability at temperatures up to about 450° C.

11. The method of claim 6, wherein the solid hydrogen transfer agent is activated in a continuous flow reactor featuring a hydrogen flow of about 100 ml/min to about 500 ml/min, a pressure of about 40 kg/cm$^2$ to about 70 kg/cm$^2$, and a temperature between about 100° C. and about 500° C. is passed for a time of about 10 hours to about 24 hours.

12. The method of claim 6, wherein the upgrading is carried out by hydrotreatment in a fixed bed reactor under operating conditions comprising a temperature of about 350° C. to about 450° C., and a pressure of about 50 kg/cm$^2$ to about 100 kg/cm$^2$.

13. The method of claim 6, wherein an upgrading of heavy or extra-heavy crudes or residues comprises an increase in API gravity of about 3 units to about 6 units, a decrease in viscosity up to about 100 cSt determined at 37.8° C., and an increase in distillate yield as determined by True Boiling Point ("TBP") naphtha and intermediate distillates between about 10% to about 20% by volume.

14. The method of claim 6, wherein the solid hydrogen transfer agent maintains constant activity in the hydrotreatment of a heavy crude by showing a constant viscosity in the product for a time period of at least 20 days.

* * * * *